United States Patent [19]

Podszun et al.

[11] Patent Number: 6,025,443
[45] Date of Patent: Feb. 15, 2000

[54] PROCESS FOR THE PRODUCTION OF SPHERICAL POLYMERS

[75] Inventors: Wolfgang Podszun, Köln; Joachim Krüger, Monheim; Olaf Halle, Köln, all of Germany; Frank Louwet, Diepenbeek, Belgium

[73] Assignee: Agfa Gevaert AG, Germany

[21] Appl. No.: 09/133,257

[22] Filed: Aug. 13, 1998

[30] Foreign Application Priority Data

Aug. 20, 1997 [DE] Germany .............................. 197 36 094

[51] Int. Cl.⁷ .................................................... C08F 291/00
[52] U.S. Cl. ........................ 525/243; 525/260; 525/265; 525/313
[58] Field of Search ..................... 525/243, 260, 525/265, 313

[56] References Cited

U.S. PATENT DOCUMENTS 5,045,395  9/1991  Podszun .
5,147,937  9/1992  Frazza et al. ............................ 525/243

FOREIGN PATENT DOCUMENTS 0 173 789 A2  3/1986  European Pat. Off. .
0 399 729  11/1990  European Pat. Off. .
0 448 391 A2  9/1991  European Pat. Off. .

*Primary Examiner*—Melvyn I. Marquis
*Attorney, Agent, or Firm*—Connolly Bove Lodge & Hutz

[57] ABSTRACT

Bead polymers having an average particle size of 1 to 30 $\mu$m and a narrow particle size distribution are obtained by the seed/feed process if a crosslinked polymer having a soluble fraction of less than 25 wt. % and an average particle size of 0.5 to 10 $\mu$m is used as the seed.

6 Claims, No Drawings

PROCESS FOR THE PRODUCTION OF SPHERICAL POLYMERS

This invention relates to the production of spherical polymers having an average particle size of 1 to 30 μm by a seed/feed process.

Spherical polymers having an average particle size of 1 to 30 μm are used in many different applications, for example as spacers in film materials, as supports for catalysts, as calibration substances for light scattering measurements or as starting materials for chromatographic resins and ion exchangers. Polymers of the most highly uniform particle size possible (hereinafter referred to as "monodisperse") are desired in many applications.

Emulsion polymerisation is well suited to the production of polymers having average particle sizes of <1 μm, in particular for particles of 20 to 500 nm. Polymers having particle sizes of 30 to approx. 1000 μm may be produced by suspension polymerisation. However, in contrast, there are no simple direct methods for synthesising polymers having average particle sizes of 1 to 30 μm.

It has proved possible, starting from monodisperse emulsion polymer particles as the seed, to produce polymers having particle sizes of some μm and a narrow particle size distribution by means of multi-stage syntheses. However, these multi-stage syntheses are difficult to perform and are not very economic.

Polymer dispersions having monodisperse particles between 3 and 10 μm may be produced according to EP 0 399 729 by adding to a seed an ethylenically unsaturated monomer, which has a refractive index which differs from that of the monomer used to produce the seed. In this process, the added monomer is added in small portions wherein intervals are required between the additions during which the added monomer may be consumed by the polymerisation reaction.

EP 448 391 describes a process in which uniform polymer particles having a particle size of 1 to 50 μm are produced by adding a monomer stream to an aqueous dispersion of seed particles in the presence of a dispersion stabiliser and an oil-soluble initiator at a temperature at which the initiator is active over a period of 45 to 120 minutes.

One problem associated with known seed/feed processes is that the quantity of dispersion stabiliser used is highly critical: excessively large quantities of dispersion stabiliser prevent the monomer from penetrating the seed, while excessively small quantities cannot reliably prevent the beads from agglomerating. If relatively large quantities of protective colloid are used, a new generation of particles frequently arises which is caused by unabsorbed monomer.

Another critical factor in known seed/feed processes is the rate of monomer addition during the feed stage. The monomer must be added at the rate at which it is consumed by swelling and polymerisation. Monomer which has not penetrated the seed in good time may result in the formation of the new generation of particles of an unwanted particle size.

The grain size distribution of the bead polymers obtained in known seed/feed processes thus does not in every case correspond to the theoretical grain size distribution which may be calculated from the seed, but is instead generally somewhat broader.

There is a requirement for a robust, widely applicable seed/feed process which does not exhibit the stated disadvantages.

It has surprisingly been found that seed/feed processes are very simple to perform and yield bead polymers of a particle size distribution which is an exact, enlarged reproduction of the seed used, if a crosslinked polymer having a particle size of 0.5 to 10 μm is used as the seed.

The present invention accordingly provides a process for the production of bead polymers having an average particle size of 1 to 30 μm using the seed/feed process, characterised in that the seed used is a crosslinked polymer having a soluble fraction of less than 25 wt. % and an average particle size of 0.5 to 10 μm.

The process according to the invention comprises the following stages:

1. suspending a crosslinked polymer having a soluble fraction of less than 25 wt. % and an average particle size of 0.5 to 10 μm as the seed in a continuous, aqueous phase.
2. adding a mixture (feed) of monomer, initiator and optionally further additives to the resultant seed suspension before polymerisation, wherein the mixture permeates the seed.
3. polymerising the swollen seed at elevated temperature to yield bead polymers.

Crosslinked, spherical polymers, having an average particle size of 0.5 to 10 μm are used as the seed. For the purposes of the invention, crosslinked polymers are taken to mean those polymers which are largely insoluble in a good solvent such as ethyl acetate or tetrahydrofuran (THF). The soluble fraction thereof is less than 25 wt. %, preferably less than 20 wt. %. The soluble fraction may be determined by 6 hours' extraction with THF in a Soxhlet extractor. The bead polymers have a high degree of swelling so that they can completely absorb the monomer added during the seed/feed process. The swelling index (SI) is defined as the quotient of the volume of the swollen polymer and the volume of the unswollen polymer. The swelling index of polymers suitable according to the invention is 2 to 30, preferably 3 to 15 (measured at 25° C. in THF).

Crosslinked polymers suitable as seed may, for example, be produced by emulsion polymerisation or dispersion polymerisation from free-radically polymerisable monomers. Monomers suitable for this purpose are monoethylenically unsaturated compounds and polyethylenically unsaturated compounds, which generally act as crosslinking agents, together with mixtures thereof.

Suitable monoethylenically unsaturated compounds are, for example, styrene, α-methylstyrene, chlorostyrene, acrylic acid esters, methacrylic acid esters, in particular methyl methacrylate, acrylonitrile, methacrylonitrile, methacrylamide and vinyl acetate. Examples of polyethylenically unsaturated compounds which may be mentioned are divinylbenzene, ethylene glycol dimethacrylate, butanediol dimethacrylate, allyl methacrylate, methylene N,N'-bisacrylamide, trimethylolpropane triacrylate, butadiene, isoprene, 1,7-octadiene and 1,5-hexadiene.

Seed polymers which are particularly suitable according to the invention are polymers prepared from vinyl monomers crosslinked with Si—O—Si groups and having an average particle diameter in the range from 0.5 to 10 μm, preferably from 1 to 7 μm, and a narrow particle diameter distribution according to EP 417 539.

Seed polymers crosslinked by ester groups which are also highly suitable according to the invention may be obtained using the method of EP 466 982.

The shape of the particle size distribution curve of the seed must correspond to that of the desired final product. A crosslinked polymer having a narrow or monodisperse distribution is accordingly used to produce a bead polymer having a narrow or monodisperse distribution.

The polymers according to the invention have a diameter which is at least 20% larger than that of the seed polymers used for the production thereof.

The polymers according to the invention have a semi-IPN structure if the feed contains only monoethylenically unsaturated compounds as the monomer or an IPN structure if at least a proportion of polyethylenically unsaturated compounds is used in the feed. An IPN structure is taken to mean an interpenetrating polymer network. In a (true) IPN, two polymer networks interpenetrate. In a semi-LPN, two polymers interpenetrate, only one of which is crosslinked.

The polymers according to the invention have elevated monodispersity. For the purposes of the present invention, monodispersity is defined as the percentage of the particles extending over the particle size range from 33% below the average particle diameter to 33% above the average particle diameter. Monodispersity is at least 65%, preferably at least 75%, particularly preferably at least 85%.

The seed polymer is suspended in an aqueous phase, wherein the ratio of polymer and water is largely immaterial. The ratio may, for example, be between 2:1 and 1:20. It is not absolutely essential at this point to use an auxiliary, for example a surfactant or protective colloid, but the protective colloids and surfactants stated below may be used. It has proved particularly favourable during dispersion of the seed to use only a proportion, for example 10 to 50%, of the quantity of protective colloid which is used for the subsequent polymerisation. The remainder is then added only immediately before polymerisation is initiated by raising the temperature. The suspension may be prepared using, for example, a normal gate or paddle stirrer, wherein low to moderate shear forces are applied.

A mixture (feed) of monomer, initiator and optionally further additives is added to the suspended seed polymer. Addition is made, for example, at room temperature, but in any case at a temperature at which the initiator used is not active.

Suitable monomers are the monoethylenically unsaturated compounds and polyethylenically unsaturated compounds already mentioned above, together with acrylic acid and methacrylic acid. Styrene and (meth)acrylic acid esters, in particular methyl methacrylate, are particularly suitable. The monomers or monomer mixtures should be largely insoluble in the aqueous phase. Partially water-soluble monomers, such as acrylic acid, methacrylic acid and acrylonitrile, are thus used as a mixture with water-insoluble monomers. It is also possible to reduce the solubility of the monomers in the aqueous phase by adding salt.

Initiators suitable for the process according to the invention are preferably oil-soluble initiators. The following may be mentioned by way of example: peroxy compounds such as dibenzoyl peroxide, dilauryl peroxide, bis(p-chlorobenzoyl peroxide), dicyclohexylperoxydicarbonate, tert.-butyl peroctoate, 2,5-bis(2-ethylhexanoylperoxy)-2,5-dimethylhexane and tert.-amylperoxy-2-ethylhexane, as well as azo compounds such as 2,2'-azobis(isobutyronitrile) and 2,2'-azobis(2-methylisobutyronitrile). The initiators are generally used in quantities of 0.05 to 2.5, preferably 0.2 to 1.5 wt. %, relative to the monomer.

Further additives which may be present in the feed are stabilisers, such as benzotriazole derivatives or small quantities of inhibitors such as hydroquinone monomethyl ether.

The weight ratio of seed polymer to feed (seed/feed ratio) is generally 1:1 to 1:20, preferably 1:2 to 1:10, particularly preferably 1:2 to 1:8. At a given particle size of the crosslinked polymer used as the seed, the seed/feed ratio may be used to adjust the particle size of the bead polymer.

This is a substantial advantage in comparison with direct syntheses, in which it is generally very difficult exactly to establish a given particle size. The maximum quantity of feed which is completely absorbed by the seed is determined by the swelling index of the seed.

Polymerisation of the swollen seed to yield the bead polymer proceeds in the presence of one or more protective colloids and optionally a surfactant. The protective colloids used are natural or synthetic water-soluble polymers, such as gelatine, starch, polyvinyl alcohol, polyvinylpyrrolidone, polyacrylic acid, polymethacrylic acid and copolymers prepared from (meth)acrylic acid and (meth)acrylic acid esters, as well as water-soluble copolymers having maleic acid units. Cellulose derivatives are also suitable, in particular cellulose esters and cellulose ethers, such as carboxymethylcellulose and hydroxyethylcellulose. Polyvinylpyrrolidone and polyvinyl alcohol are preferred. The quantity of protective colloid used is generally 0.05 to 1 wt. %, relative to the aqueous phase, preferably 0.1 to 0.5 wt. %.

The process according to the invention is preferably performed in the presence of a surfactant. The surfactant may be ionic or nonionic. Ionic surfactants are preferred. Examples of nonionic surfactants are ethoxylated nonylphenols. Suitable anionic surfactants are alkyl sulphonates and in particular the sodium salt of sulphosuccinic acid esters. N-alkylammonium salts, such as for example methyltricaprylammonium chloride, may be mentioned as cationic surfactants. The surfactant is used in a quantity of 0.05 to 5 wt. %, preferably of 0.1 to 1 wt. %, relative to the aqueous phase.

In a preferred embodiment of the present invention, the aqueous phase contains a dissolved polymerisation inhibitor. Both inorganic and organic substances may be considered as inhibitors. Examples of inorganic inhibitors are, for example, nitrogen compounds such as hydroxylamine, hydrazine, sodium nitrite and potassium nitrite. Examples of organic inhibitors are phenolic compounds such as hydroquinone, hydroquinone monomethyl ether, resorcinol, pyrocatechol, tert.-butyl pyrocatechol, condensation products prepared from phenols with aldehydes. Other organic inhibitors are compounds containing nitrogen, such as for example diethylhydroxylamine and isopropylhydroxylamine. The concentration of the inhibitor is 5 to 1000 ppm (relative to the aqueous phase), preferably 10 to 500 ppm, particularly preferably 20 to 250 ppm.

Stirring speed during polymerisation is not very critical and, unlike in conventional bead polymerisation, has no influence upon particle size. Low stirring speeds are used which are sufficient to maintain the suspended particles in suspension and to promote dissipation of the heat of polymerisation.

The polymerisation temperature is determined by the decomposition temperature of the initiator used. It is generally between 50 and 150° C., preferably between 55 and 100° C. Polymerisation lasts for 0.5 to some hours. It has proved expedient to use a temperature program in which polymerisation is started at a low temperature, for example 60° C., and the reaction temperature is then increased as polymerisation conversion proceeds. This ensures that the requirement for a reliable course of the reaction and elevated polymerisation conversion is achieved very effectively. After polymerisation, the polymer may be isolated using conventional methods, for example filtration or decanting, and dried, optionally after being washed once or more.

EXAMPLES

Example 1
Production of a seed polymer 56 g of polyvinylpyrrolidone, 8 g of methyltricaprylammonium chloride and 0.64 g of azodiisobutyronitrile were dissolved in 1600 ml of methanol in a reaction flask equipped with a reflux condenser, stirrer and thermometer. A mixture of 97.5 g of methyl methacrylate and 2.5 g of γ-methacryloxypropyltrimethoxysilane was added to the solution. The mixture was heated for 5 hours while being stirred and then cooled to 25° C. 100 ml of 1n HCl were then added dropwise. Stirring was continued for a further hour at 25° C., then the bead polymer was isolated by centrifugation, washed with methanol and dried at 50° C. 70 g of a monodisperse bead polymer were obtained. Average particle size was 3.8 μm, the swelling index 7.5 and the soluble fraction 15%.

Example 2
Production of a seed polymer 75.6 g of polyvinylpyrrolidone, 10.8 g of methyltricaprylammonium chloride and 0.91 g of azodiisobutyronitrile were dissolved in a mixture of 1080 ml of ethanol and 1080 ml of isopropanol in a reaction flask equipped with a reflux condenser, stirrer and thermometer. A mixture of 137.2 g of methyl methacrylate and 2.8 g of γ-methacryloxypropyltrimethoxysilane was added to the solution. The mixture was heated for 5 hours while being stirred and then cooled to 25° C. 100 ml of 1n HCl were then added dropwise. Stirring was continued for a further hour at 25° C., then the bead polymer was isolated by centrifugation, washed with methanol and dried at 50° C. 78 g of a monodisperse bead polymer were obtained. Average particle size was 7.5 μm, the swelling index 8.5 and the soluble fraction 17.5%.

Example 3
Production of a seed polymer 8.2 g of polyvinylpyrrolidone, 32.8 g of nonylphenol polyglycol (with 6 ethylene oxide units) were dissolved in a mixture of 4260 g of methanol and 2050 g of deionised water in a reaction flask equipped with a reflux condenser, stirrer and thermometer. 1600 g of methyl methacrylate were added to the mixture. The mixture was heated to 65° C. while being stirred. 33 g of γ-methacryloxypropyltrimethoxysilane and 8.2 g of sodium peroxydisulphate, dissolved in 33 g of deionised water, were then added and stirred for 24 hours at 65° C. The reaction mixture was cooled to 25° C. The bead polymer was isolated from the resultant dispersion by centrifugation, washed with methanol and dried at 50° C. A monodisperse bead polymer was obtained having an average particle size of 3.9 μm, a swelling index 4.3 and a soluble fraction of 2.8%.

Example 4
Seed/feed process according to the invention 43.8 g of seed polymer from Example 1 were dispersed in a mixture of 1350 g of deionised water, 6 g of polyvinyl alcohol, 6 g of methyltricaprylammonium chloride and 0.2 g of diethylhydroxylamine in a reaction flask equipped with a reflux condenser, stirrer and thermometer. A feed of 135.8 g of methyl methacrylate and 1.81 g of dibenzoyl peroxide was added dropwise to this dispersion within one hour at room temperature. The reaction mixture was then stirred for 10 hours at room temperature and then for a further 10 hours at 75° C. Once cool, the bead polymer was isolated by centrifugation, washed with methanol and dried at 50° C. Yield was 178 g, average particle size 6.0 μm.

Example 5
Seed/feed process according to the invention

Example 4 was repeated, but using 22.6 g of seed polymer from Example 2 instead of 43.8 g of seed polymer from Example 1. Yield was 158 g, average particle size 14.2 μm.

Example 6
Seed/feed process according to the invention 50 g of seed polymer from Example 3 were dispersed in a mixture of 1320 g of deionised water, 4.5 g of polyvinylpyrrolidone, 4.5 g of sulphosuccinic acid bis-(2-ethylhexyl ester) sodium salt and 0.2 g of diethylhydroxylamine in a reaction flask equipped with a reflux condenser, stirrer and thermometer. A feed of 150 g of methyl methacrylate and 2 g of dibenzoyl peroxide was added dropwise to this dispersion within one hour at room temperature. The reaction mixture was then stirred for 10 hours at room temperature and then for a further 10 hours at 75° C. Once cool, the bead polymer was isolated by centrifugation, washed with methanol and dried at 50° C. Yield was 198 g, average particle size 5.9 μm.

We claim:

1. Process for the production of bead polymers having an average particle size of 1 to 30 μm using a seed/feed process, wherein the seed comprises a crosslinked polymer having a soluble fraction of less than 25 wt. % and an average particle size of 0.5 to 10 μm, and wherein the feed comprises a mixture of monomer, initiator and optionally further additives, the process comprising the steps of:

(a) suspending the crosslinked polymer in a continuous, aqueous phase, (b) adding the feed mixture of monomer, initiator, and optionally further additives to the resultant seed suspension before polymerisation, wherein the mixture permeates the seed to produce a swollen seed, and (c) polymerising the swollen seed at elevated temperature to yield the bead polymers.

2. Process according to claim 1, wherein vinyl monomers crosslinked with Si—O—Si-groups are used for the production of the crosslinked polymer acting as the seed.

3. Process for the production of bead polymers according to claim 1, characterised in that polymerisation is performed in the presence of a protective colloid and a surfactant.

4. Process for the production of bead polymers according to claim 1, characterised in that polymerisation is performed in an aqueous phase which contains a dissolved polymerisation inhibitor.

5. Process for the production of bead polymers according to claim 1, characterised in that the feed contains styrene and/or (meth)acrylic ester as the monomer.

6. Process according to claim 1, characterised in that the final product has a diameter which is at least 20% larger than that of the seed polymer used.

* * * * *

UNITED STATES PATENT AND TRADEMARK OFFICE
CERTIFICATE OF CORRECTION

PATENT NO. : 6,025,443
DATED : February 15, 2000
INVENTOR(S) : Wolfgang Podszun, et. al.

It is certified that error appears in the above-identified patent and that said Letters Patent is hereby corrected as shown below:

Column 3, line 10, "semi-LPN" should read --semi-IPN--.

Signed and Sealed this

Fourteenth Day of November, 2000

Attest:

Q. TODD DICKINSON

Attesting Officer          Director of Patents and Trademarks